United States Patent
Asao

[19]

[11] Patent Number: 6,114,783

[45] Date of Patent: Sep. 5, 2000

[54] AC GENERATOR FOR USE IN A VEHICLE

[75] Inventor: Yoshihito Asao, Tokyo, Japan

[73] Assignee: Mitsubishi Denki Kabushiki Kaisha, Tokyo, Japan

[21] Appl. No.: 09/306,638

[22] Filed: May 7, 1999

[30] Foreign Application Priority Data

Nov. 27, 1998 [JP] Japan ................................ 10-337573

[51] Int. Cl.$^7$ ................................................. H02K 9/06
[52] U.S. Cl. ........................ 310/58; 310/68 D; 310/60 R; 310/59
[58] Field of Search .................. 310/52, 58, 59, 310/60 R, 61, 62, 63, 60 A, 68 D, 68 R; 29/596, 597, 598

[56] References Cited

U.S. PATENT DOCUMENTS

| | | | |
|---|---|---|---|
| 5,241,230 | 8/1993 | Tanaka et al. | 310/62 |
| 5,682,070 | 10/1997 | Adachi et al. | 310/71 |
| 5,686,780 | 11/1997 | Adachi et al. | 310/68 D |
| 5,729,063 | 3/1998 | Adachi et al. | 310/68 D |
| 5,742,107 | 4/1998 | Asao et al. | 310/62 |

FOREIGN PATENT DOCUMENTS 3-12047 3/1991 Japan .

*Primary Examiner*—Clayton LaBalle
*Assistant Examiner*—Tran N Nguyen
*Attorney, Agent, or Firm*—Sughrue, Mion, Zinn, Macpeak & Seas, PLLC

[57] ABSTRACT

A rectifier accommodating portion, a condenser accommodating portion, a regulator accommodating portion and a connector accommodating portion are recessed on the inner surface of a rear bracket, and baniers which constitute a cooling air passageway are integrally made to protrude axially from the surface of the inner wall of the rear bracket so as to separate between each accommodating portion. Further, intake openings and a connector receiving hole are provided through the rear bracket so as to communicate the rectifier accommodating portion, the regulator accommodating portion and the connector accommodating portion from the exterior while a plurality of exhaust openings are provided through the outer circumference in the circumferential direction.

4 Claims, 17 Drawing Sheets

AC GENERATOR FOR USE IN A VEHICLE

BACKGROUND OF THE INVENTION

1. Field of the Invention

The present invention relates to an AC generator for use in a vehicle and, in particular, to an AC generator for use in a vehicle capable of improving the cooling performance by preventing interference of the air for cooling the regulator or rectifier which are heat generating parts.

2. Description of the Related Art

FIG. 11 is a cross-sectional view of the arrangement of conventional AC generator for use in a vehicle.

In the conventional AC generator, a rotor 7 is rotatably fitted within a case 3 comprising a front bracket 1 and a rear bracket 2 each made of aluminum by way of a shaft 6 while a stator 8 is fixed on the inner surface of the case so as to cover the outer periphery of the rotor 7.

The shaft 6 is rotatably supported by mean of the front bracket 1 and the rear bracket 2. A pulley 4 is fixed to one of the shaft 6 so that the rotational torque of the engine may be transmitted to the shaft 6 by way of a belt (not shown).

A slip ring 9 for supplying the current to the rotor 7 is fixed to the other end portion of the shaft 6, and a pair of brushes 10 are accommodated within a brush holder 11 disposed within the case 3 so as to come in sidable contact with the slip ring 9. A regulator 18 for regulating the output voltage of the stator 8 is adhered to a heat sink 17 fitted on the brush holder 11. A rectifier 12 is mounted within the case 3 and is electrically connected to the stator 8 to rectify the AC current generated in the coil of the stator 8 into the DC current.

The rotor 7 is comprised of a rotor coil 13 for generating the magnetic flux when a current flows therein, and a pair of pole cores 14 provided so as to cover the rotor coil 13 and be magnetic poles as a result of the magnetic flux generated by the rotor coil 13. Further centrifugal fans 5 are fixed to both axial ends of the rotor 7.

The stator 8 is formed by a stator core 15 and a stator coil 16 achieved by winding a conductor wire around the stator core 15, in which the AC current is generated by alternating the magnetic flux of the rotor 7 with the rotation of the rotor 7.

Next, the arrangement of the brush holder 11 is described with reference to FIGS. 12 through 14.

The brush holder 11 is molded from insulating resin, and is integrally molded with an annular shaft receiving portion 19, a circuit accommodating portion 22, a connector portion 23 and a condencer accommodating portion 24. Inserted conductors are insert-molded into the brush holder 11. The inserted conductors constitute wiring paths between each of the elements mounted in the brush holder 11, as well as projecting into the connector portion 23 to form connecting terminals 23a, and are exposed where necessary to form connecting terminals 34, etc., for electric junction to the rectifier 12. Further, the brushes 10 are accommodated within the brush holder 11 such that one end of each of the brushes 10 protrudes into the shaft receiving portion 19.

Further, a ceramic substrate 21 mounted with diodes and semiconductors, etc., and served as the regulator 18 is secured by adhesive to either one surface of the heat sink 17. The heat sink 17 is disposed with the circuit accommodating portion 22 so that the ceramic substrate 21 is positioned within the circuit accommodating portion 22, and the heat sink 17 and edges portions of the circuit accommodating portion 22 are sealed. The ceramic substrate 21 and the exposed electric junction of the inserted conductors are electrically interconnected, and the sealing resin is poured into the circuit accommodating potion 22 for hardening. Further, on the other surface of the heat sink 17, a multiplicity of fins are provided side by side. Still further, in order to eliminate electrical noise, a condenser 29 is accommodated within the condenser accommodating portion 24.

With this brush holder 11, the circuit accommodating portion 22, the connector portion 23 and the condenser accommodating portion 24 are disposed so as to substantially scatter on a plane, which intersects at a light angle with the axial center of the shaft receiving potion 19, in the circumferential direction thereof in such a way that they do not overlap each other in the axial direction of the shaft receiving portion 19. The heat sink 17 is disposed so that the longitudinal direction of the fin (the fin located at the central portion) directs toward the axial center of the shaft receiving portion 19.

Next, the construction of the rectifier 12 is described with reference to FIG. 15.

The rectifier 12 comprises a pair of arc-shaped heat sinks 31a, 31b each having positive and negative diodes 32a, 32b plurally mounted on the main surface thereof, and an arc-shaped circuit board 33 in which a number of conductors are insert-molded into insulating resin. The pair of heat sinks 31a, 31a are arranged coaxially with their main surfaces lying substantially in the same plane, and the circuit board 33 is arranged on the main surfaces of the pair of heat sinks 31a, 31b so that they constitute the arc-shaped rectifier 12 integrally. The conductors constitute wiring paths between the diodes 32a, 32b, as well as being exposed where necessary to form connecting terminals 33a for electric junction to the connecting terminals 34 of the brush holder 11. Provided on the rear surface of the heat sink 31a are a multiplicity of fins with their longitudinal direction directed in the radial direction.

Here, the rear bracket 2 is made in the form of a bowl by casting or aluminum die casting. As shown in FIG. 16, a rectifier accommodating portion 20a, a condenser accommodating portion 20b, a regulator accommodating portion 20c and a connector accommodating portion 20d are recessed on the inner surface of the rear bracket 2, and intake openings 2a, 2b, 2c for ventilation and a connector receiving hole 2d for receiving the external connector are provided so as to communicate the rectifier accommodating portion 20a, the regulator accommodating portion 20c and the connector accommodating portion 20d with the exterior.

As shown in FIG. 17, the rectifier 12 is positioned within the rectifier accommodating portion 20a and the circuit accommodating portion 22, connector portion 23 and condenser accommodating portion 24 are positioned within the regulator accommodating portion 20c, the connector accommodating portion 20d and the condenser accommodating portion 20b, respectively, so that the rectifier 12 and the brush holder 11 are incorporated into the rear bracket 2. That is, the rectifier 12 and the brush holder 11 are ) incorporated into the substantially identical plane so as to surround the shaft 6.

In the conventional AC generator arranged as above, the current is supplied to the rotary coil 13 from a battery (not shown) by way of the brushes 10 and the slip rings 9, and a magnetic flux is generated. The claw-shaped magnetic poles of the pair of pole cores 14 are magnetized to N polarities and S polarities by the magnetic flux, respectively. On the other hand, the rotational torque of the engine is transmitted to the shaft 6 by way of the belt and the pulley 4, and the rotor 7 is rotated. Thus, a rotational magnetic field is imparted to the stator coil 16 and the electromotive force is generated in the stator coil 16. This AC electromotive force is rectified to a DC current by way of the rectifier 12, its voltage is regulated by the regulator 18, and the battery is recharged.

While the AC generator is generating electricity, the rotor coil 13, the stator coil 16, the rectifier 12 and the regulator 18 generate heat constantly. In the AC generator belonging to a class of rated output current 100A, the heat generation of the rotor coil 13, the stator coil 16, the rectifier 12 and the regulator 18 is each 60 W, 500 W, 120 W and 6 W at points where the temperature is high. Therefore, in order to cool the heat generating by electrical generation, the intake openings are provided at the front bracket 1 and the rear bracket 2.

First, at the rear side, as shown in FIG. 18 by arrow, the external air is sucked from the intake openings 2a, 2b, 2c into the rear bracket 2 under the action of the centrifugal fan 5 provided at the rotor 7. The external air sucked from the intake openings 2a, 2b, 2c, as shown in FIG. 19 by arrow, flows toward the edge of the inner circumference of the hear sinks 17, 31a along the fins of the heat sinks 17,31a, subsequently flows from the edge of the inner circumference of the heat sinks 17, 31a toward the front bracket 1 along the axis, and thereafter, bent in the centrifugal direction by means of the centrifugal fan 5 to be discharged to the exterior from the exhaust openings 2e of the rear bracket 2. At this time, the heat exchange between the air flowing along the fins of the heat sinks 17, 31a and the heat sinks 17, 31a suppresses the elevation of temperature of the diodes of the rectifier 12 and the power transistors of the regulator 18, which are the source of heat generation. Likewise, the air bent in the centrifugal direction by the centrifugal fan 5 cools the rear end of the stator coil 16 to suppress elevation of the temperature of the stator coil 16.

On the other, at the front side, the air sucked from the intake openings la of the front bracket 1 is bent in the centrifugal direction by means of the centrifugal fan 5 to cool the front end of the stator coil 16 to be discharged to the exterior from the exhaust openings lb of the front bracket 1.

In the conventional AC generator, since the regulator 18, the connector portion 23, the condenser 29 and the rectifier 12 are arranged in a scattered manner in the circumferential direction on the plane intersecting at a right angle with the axis center of the shaft 6 so that they do not overlap each other in the direction of the axis center, the cooling air is sucked from the intake openings 2a, 2b, 2c of the rear bracket 2 to cool the regulator 18 and the rectifier 12, and after passing around the shaft 6, is discharged in the radially outward direction.

However, the incorporated parts are of complicated form, and the boundary surfaces between the rectifier 12 and the connector portion 23 of the brush holder 11 and between the rectifier 12 and the condenser accommodating portion 24 of the brush holder 11 as viewed in the circumferential direction takes a complicated separate form while there is no member for blocking the circumferential flow of the cooling air which has cooled the rectifier 12 and the regulator 18, so that the cooling air streams flowing along the boundary surfaces become unstable in regard to its direction, which causes counterflow of the warm cooling air after cooling to exert an adverse effect on the cooling of the other heat generating portion, or causes mutual interference of the air streams leading to the loss of pressure with decrease of the amount of cooling air thus degrading the entire cooling performance.

Further, with miniaturization of the AC generator, its components tend to be disposed at adjacent positions in the radial and circumferential direction as well as even in the direction of axis, which eases unevenness of the cooling air stream more and more to degrade the entire cooling performance.

Further, the connector portion 23, which is not the heat generating portion, is inserted with the external connector 30 from the exterior, as shown in FIGS. 20 and 21. Therefore, a connector receiving hole 2d is provided at a position of the rear bracket 2 facing the insertion hole of the connector portion 23, and the unnecessary outflow of the cooling air or the wasteful air inflow not lending itself to cooling also takes place from a gap A between the connector receiving hole 2d and the connector portion 23 and between the connector receiving hole 2d and the external connector 30 to exert an adverse effect on the cooling of the heat generating portions.

Still further, in the foregoing AC generator shown in FIG. 11, each part is accommodated within the bowl-shaped rear bracket 2, but as shown in FIG. 22, there is also an AC generator in which each part is accommodated between the rear bracket 2A and the rear cover 26. In this AC generator, the rectifier 12 and the brush holder 11 are arranged circumferentially in a scattered manner on a plane intersecting at a right angle with the axial center of the shaft 6, as in the foregoing case, so that they are disposed on the rear bracket so as not to overlap each other in the direction of the axis center. Therefore, the air sucked from the intake openings 26a of the rear cover 26b under the action of the centrifugal fan 5, as shown in FIG. 22 by arrow, cools the rectifier 12 and the regulator 19, passes through their edge of the inner circumference of the rectifier 12 and the regulator 19 to flow in the axial direction, and then flow through the intake openings 2f of the rear bracket 2A into the rear bracket 2A. Thereafter, it is bent in the centrifugal direction by means of the centrifugal fan 5 to be discharged from the exhaust openings 2g to the exterior. As described above, also in this AC generator, the cooling air which has cooled the rectifier 12 and the regulator 18 flows in the axial direction, which leaves a problem as with the AC generator of FIG. 11.

SUMMARY OF THE INVENTION

The present invention has been conceived in order to solve the foregoing problem, and its object is to provide An AC generator in which the passageways of the cooling air for cooling the regulator and the rectifier are separated to reduce interference of the cooling air streams to thereby improve the cooling performance.

In order to achieve the foregoing end, according to one aspect of the invention, there is provided an AC generator for use in a vehicle, comprising: a shaft supported in a case so as to be able to rotate freely; a rotor disposed in the case and composed of a pair of pole cores each having a plurality of claw portions protruding from the outer circumferential edge portion thereof, the pole cores being fixedly fitted over the shaft in an opposed relation each other so that the claw portions are able to engage with each other; a stator disposed within the case so as to be positioned around the periphery of the rotor; centrifugal fans secured to both axial ends of the rotor; a rectifier for rectifying an alternating current generated in the stator to a direct current; a regulator for regulating an output voltage of the stator; and a connector portion to which an external connector is fitted; wherein the rectifier, the regulator and the connector portion arranged circumferentially in a scattered manner on a plane intersecting at a right angle with the axis of the shaft at one end of the shaft so as not to overlap each other in the axial direction; wherein intake openings are provided at one end surface of the case so as to face the rectifier and the regulator, and wherein a plurality of exhaust openings are provided at the outer circumference of the case in the circumferential direction; the AC generator further comprising a cooling air passageway in which the air streams that are sucked from the intake openings by the action of the centrifugal fan and that subsequently cool the rectifier and the regulator are blocked from flowing in the circumferential direction, are separated from each other and flow radially inward.

BRIEF DECRIPTION OF THE DRAWINGS

DESCRIPTION OF THE PREFERRED EMBODIMENTS

Some specific embodiments according to the present invention are hereinafter described with reference to the drawings.

First Embodiment

Figure 1:
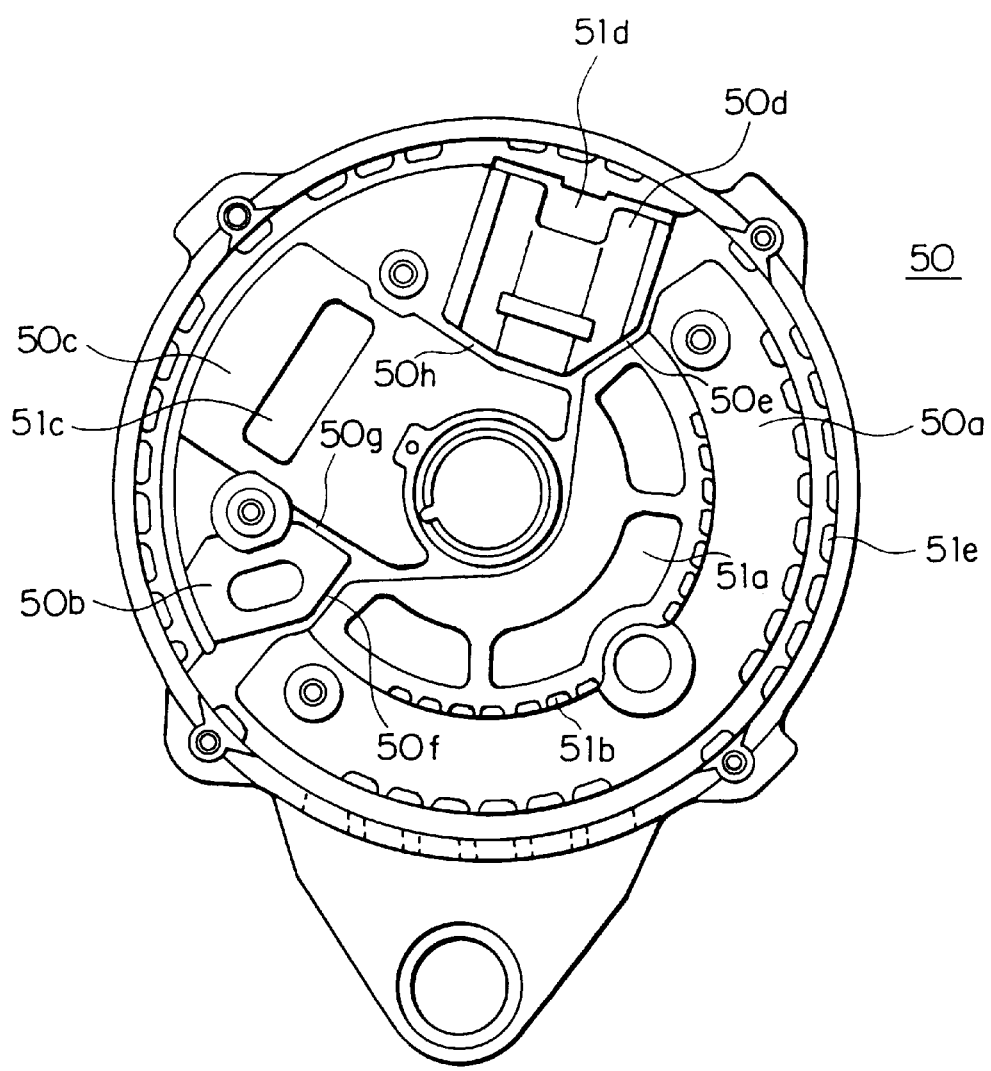
FIG. 1 is an internal view of a rear bracket applied to an AC generator for use in a vehicle according to a first embodiment of the present invention.
Figure 2:
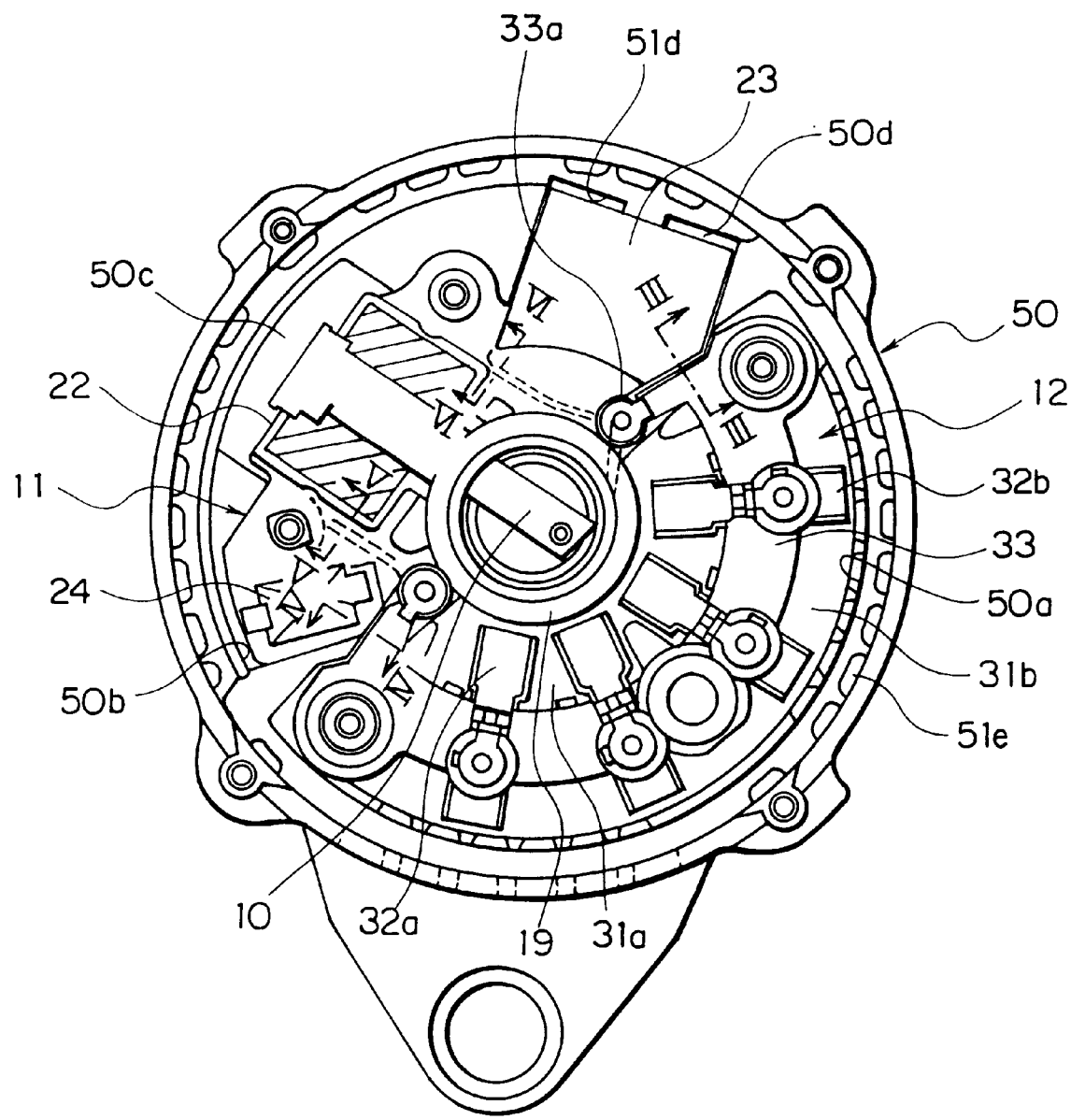
FIG. 2 is an internal view of the condition in which a rectifier and a brush holder are fitted within the rear bracket in the first embodiment of the present invention.
Figure 2A:
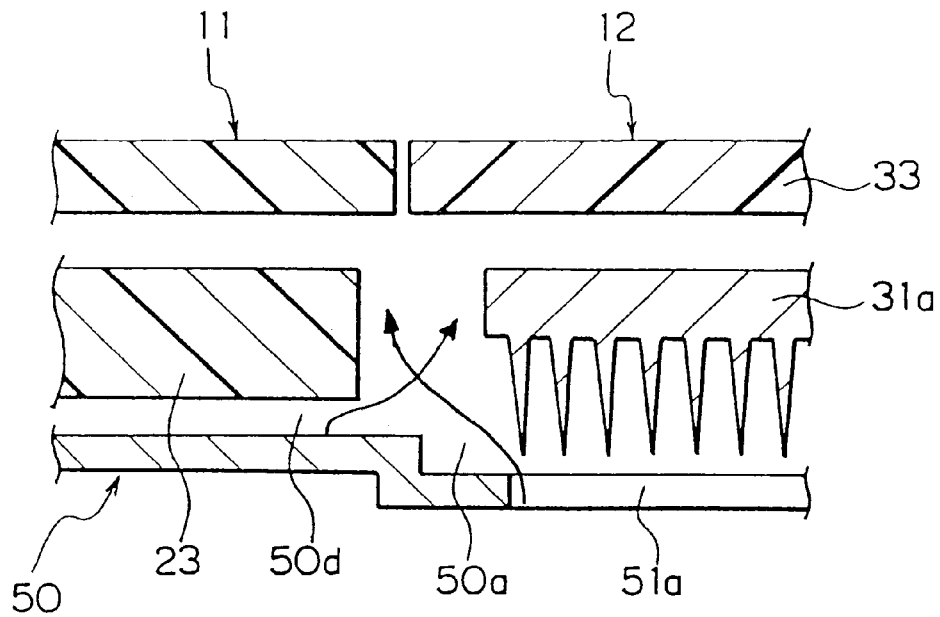
FIGS. 2A–2D shows air streams being blocked from flowing in the circumferential direction by barriers.
Figure 2B:
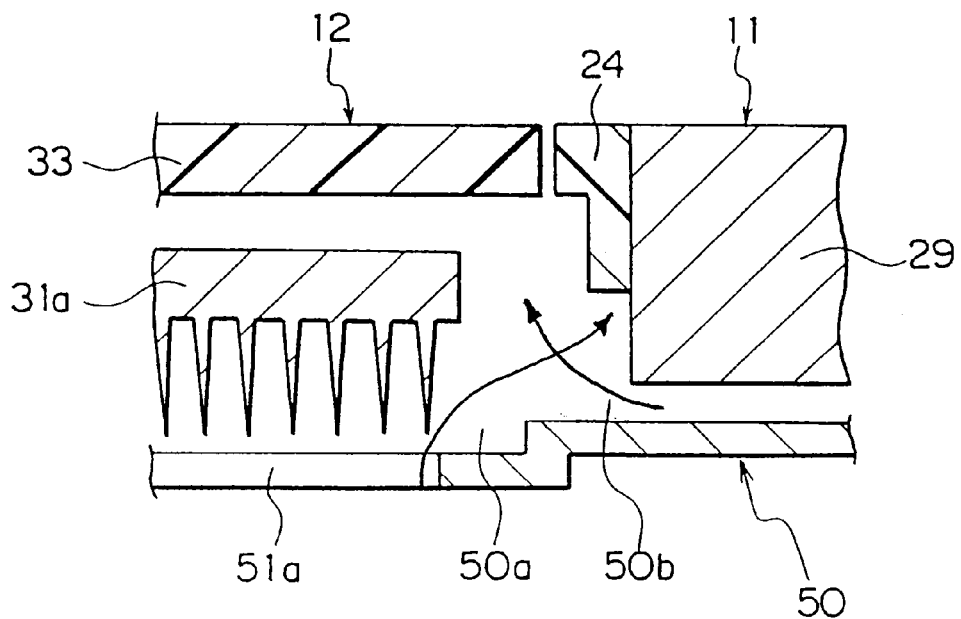
Figure 2C:
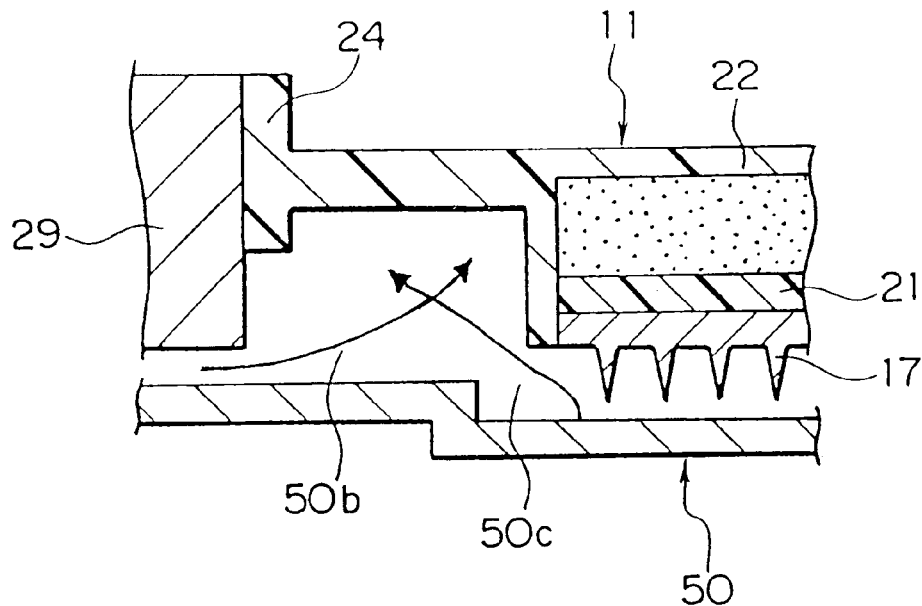
Figure 2D:
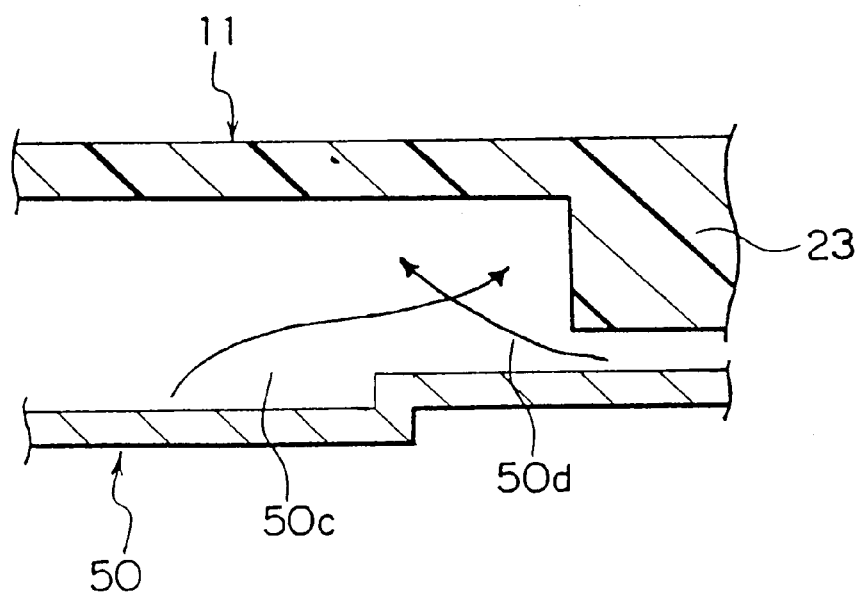
Figure 3:
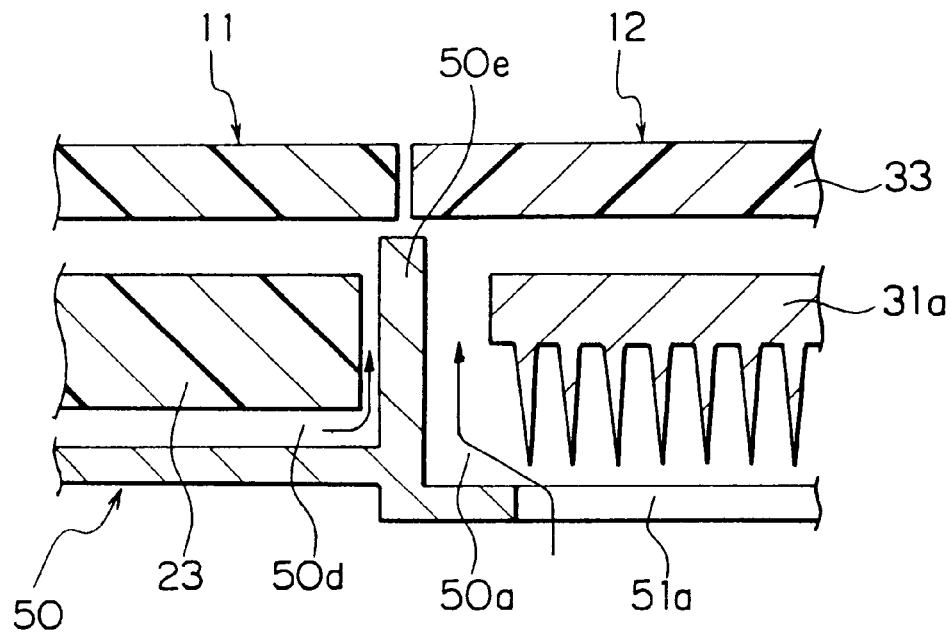
FIG. 3 is a cross-sectional view of FIG. 2 taken along line III—III thereof.
Figure 4:
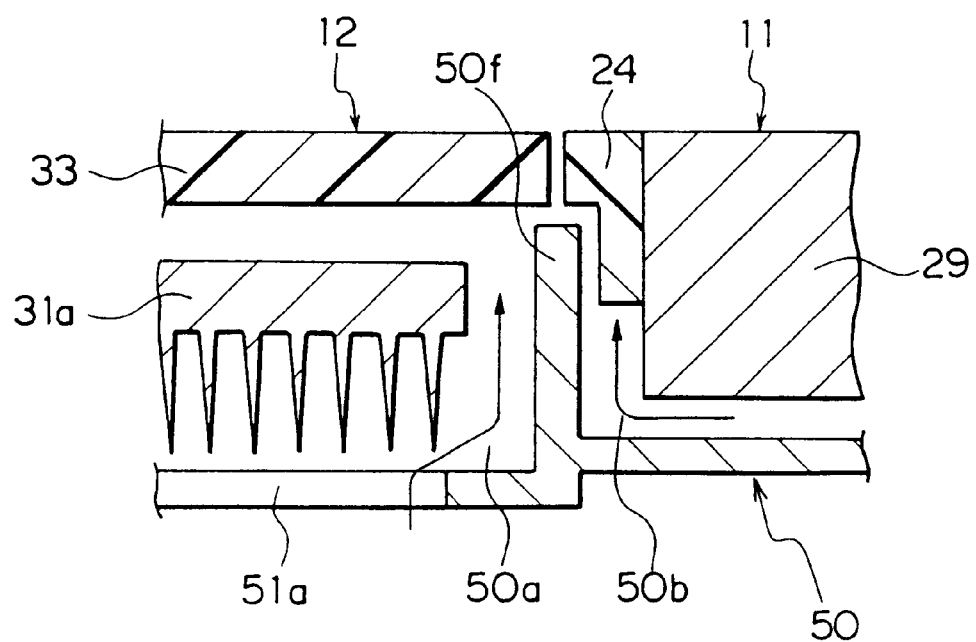
FIG. 4 is a cross-sectional view of FIG. 2 taken along line IV—IV thereof.
Figure 5:
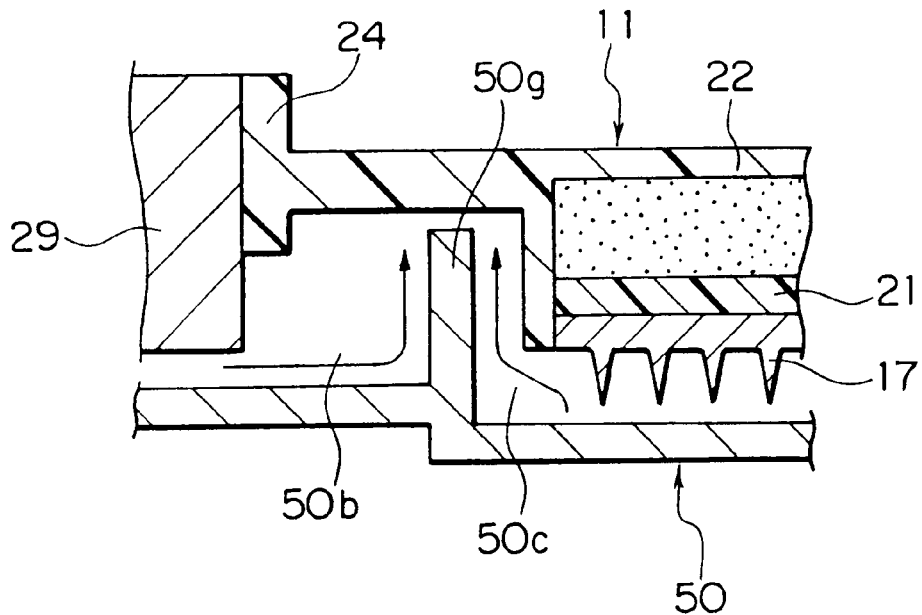
FIG. 5 is a cross-sectional view of FIG. 2 taken along line V—V thereof.
Figure 6:
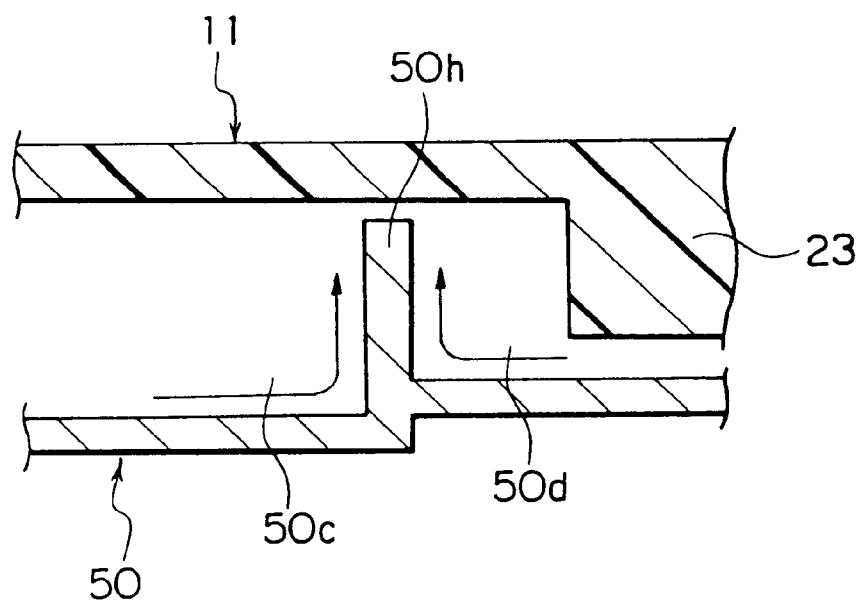
FIG. 6 is a cross-sectional view of FIG. 2 taken along line VI—VI thereof.

FIG. 1 is an internal view of a rear racket applied to the AC generator according to a first embodiment of the present invention. FIG. 2 is a an internal view of the condition in which a rectifier and a brush holder are fitted into a rear bracket in the AC generator according to the first embodiment of the present invention, FIG. 3 is a cross-sectional view of FIG. 2 taken along line III–III thereof, FIG. 4 is a cross-sectional view of FIG. 2 taken along line IV–IV thereof, FIG. 5 is a cross-sectional view of FIG. 2 taken along line V–V thereof and FIG. 6 is a cross-sectional view of FIG. 2 taken along line VI–VI thereof.

In FIGS. 1 through 6, a rear bracket 50 as the case is formed into a bowl by aluminum casting or aluminum die casting, and a rectifier accommodating portion 50a, a condenser accommodating portion 50b, a regulator accommodating portion 50c and a connector accommodating portion 50d are recessed on the inner surface of the bracket 50, and further, barriers 50e through 50h which constitute the cooling air passageway are provided to protrude integrally and axially from the inner wall of the rear bracket 50 so that they separate between each accommodating portion. Further, at the rear bracket 50, as in the conventional rear bracket 2, intake openings 51a, 51b, 51c for ventilation and a connector receiving hole 51d are provided so as to communicate the rectifier accommodating portion 50a, the regulator accommodating portion 50c and the connector accommodating portion 50d with the exterior, and a plurality of exhaust openings 51e for exhausting the cooling air are provided on the outer circumferential portion the rear bracket 50 in the circumferential direction.

A rectifier 12 is positioned within the rectifier accommodating portion 50a and the circuit accommodating portion 22, connector portion 23 and condenser accommodating portion 24 are positioned within the regulator accommodating portion 50c, the connector accommodating portion 50d and the condenser accommodating portion 50b, respectively, so that the rectifier 12 and the brush holder 11 are incorporated into the rear bracket 50. These rectifier 12, regulator 18 (ceramic substrate 21), connector portion 23 and condenser 9 are arranged circumferentially in a scattered manner on the substantially identical plane so as to surround the shaft 6 as well as not to overlap each other in the axial direction. Further, the rectifier accommodating portion 50a, the condenser accommodating portion 50b and the regulator accommodating portion 50d are separated from one another in the circumferential direction by means of the barriers 50e through 50h.

Figure 11:
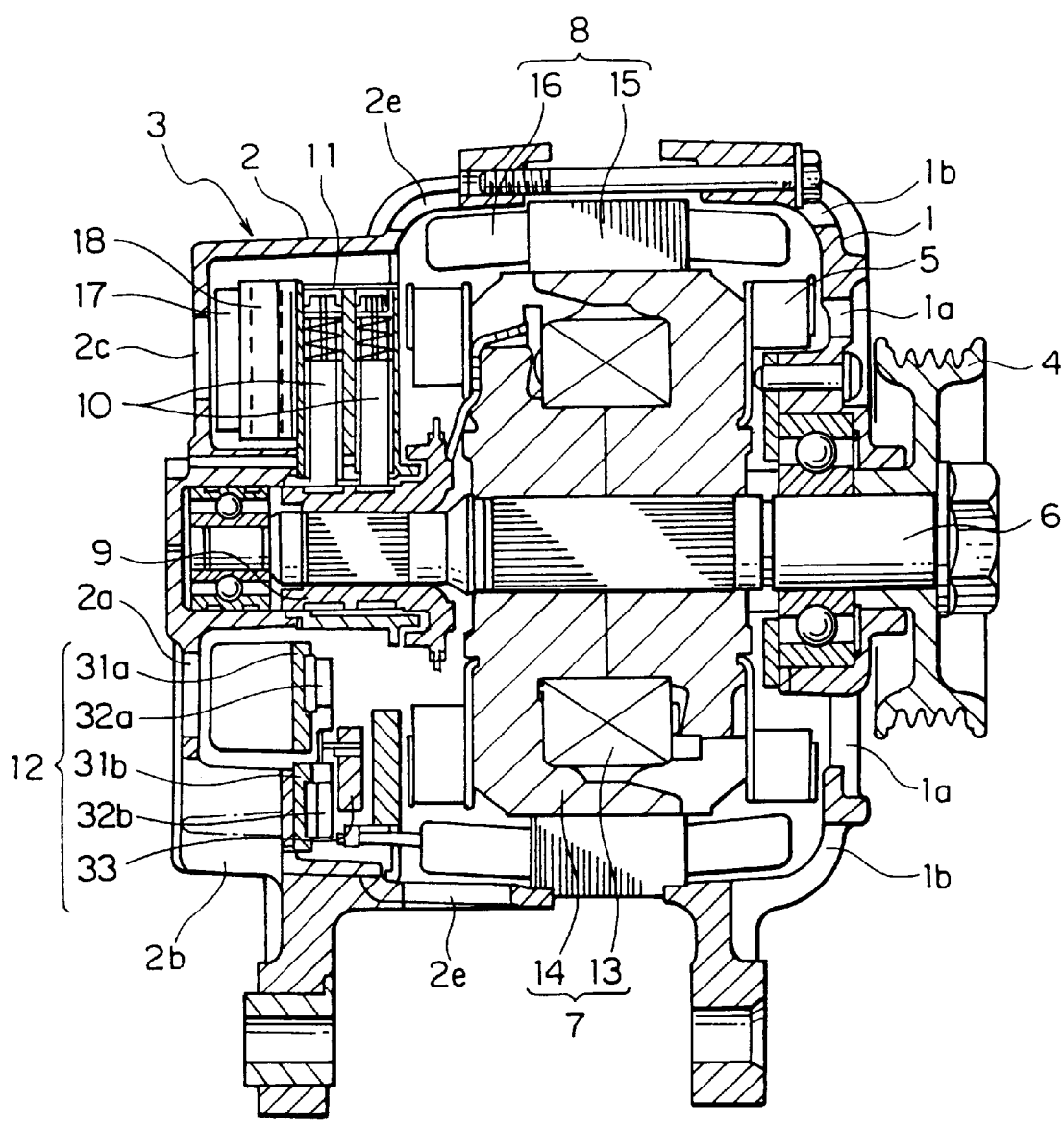
FIG. 11 is a cross-sectional view of the arrangement of a conventional AC generator.
Figure 12:
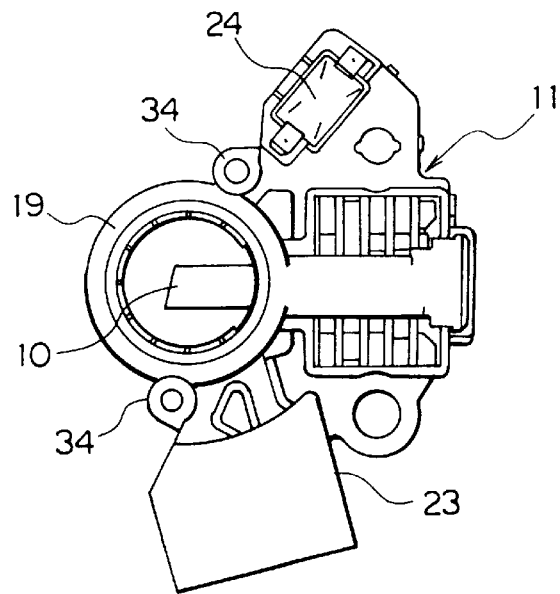
FIG. 12 is a front view of a brush holder applied to the conventional AC generator.
Figure 13:
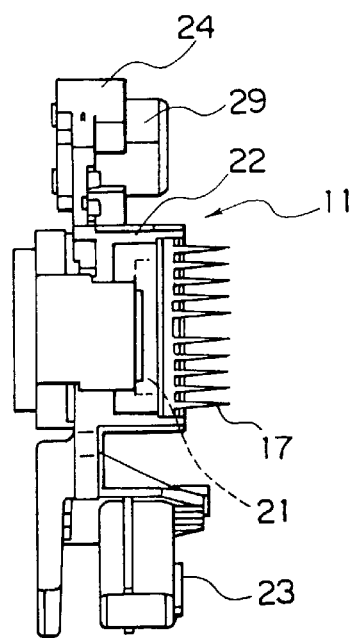
FIG. 13 is a side view of the brush holder applied to the conventional AC generator.
Figure 14:
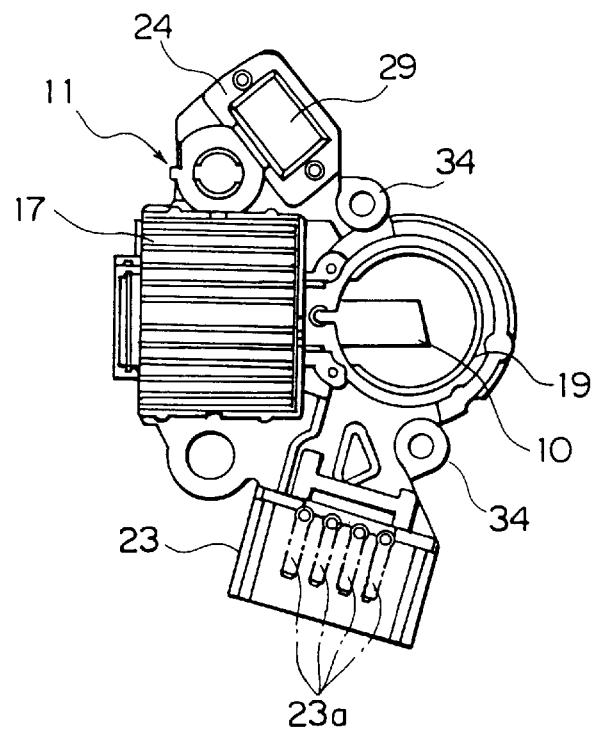
FIG. 14 is a rear view of the brush holder applied to the conventional AC generator.
Figure 15:
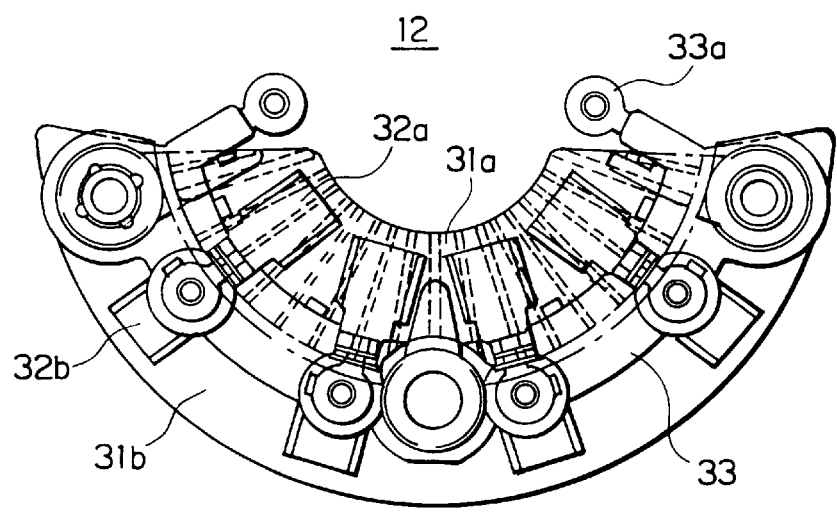
FIG. 15 is a front view of a rectifier applied to the conventional AC generator.
Figure 16:
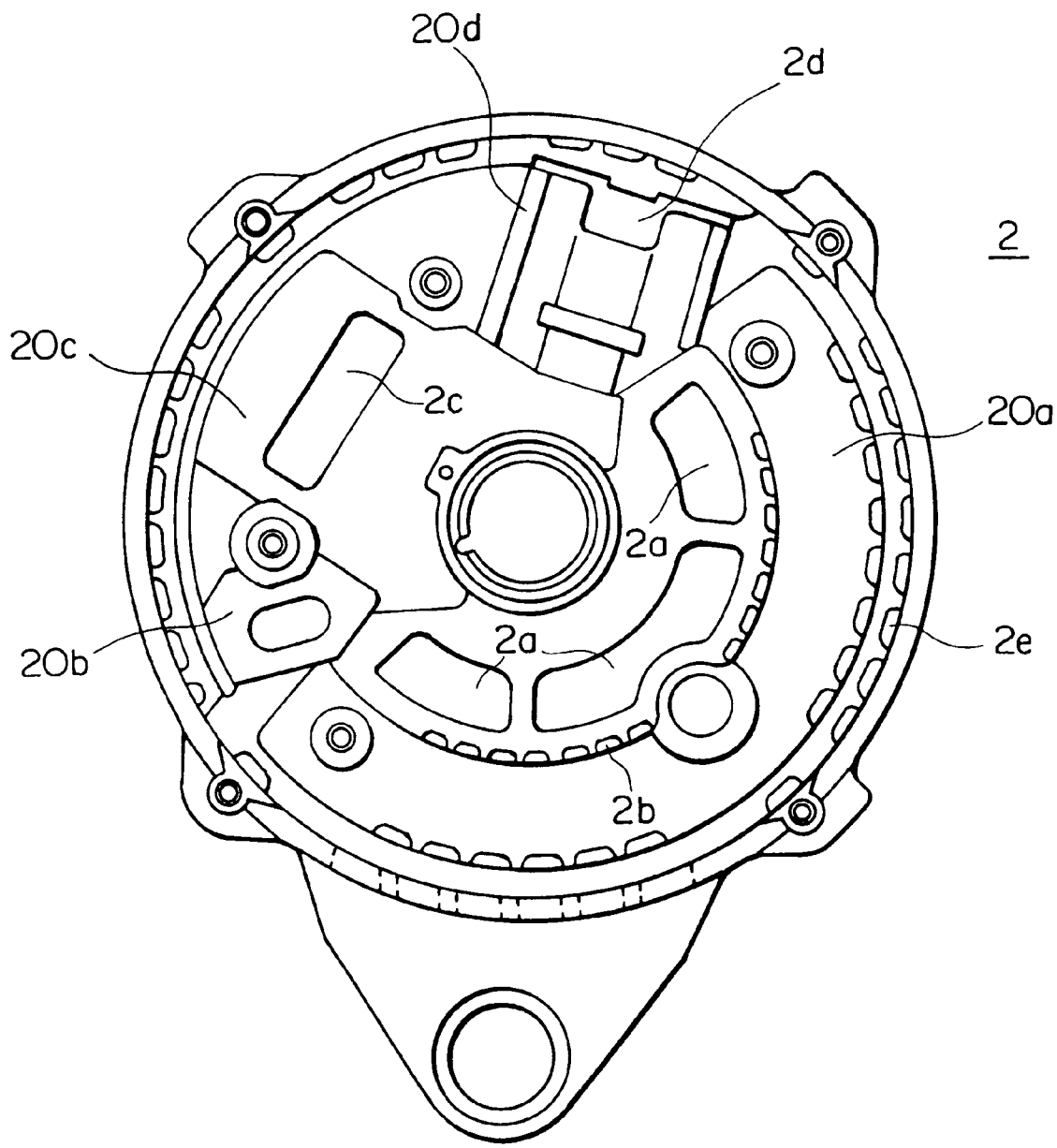
FIG. 16 is an internal view of a rear bracket applied to the conventional AC generator.
Figure 17:
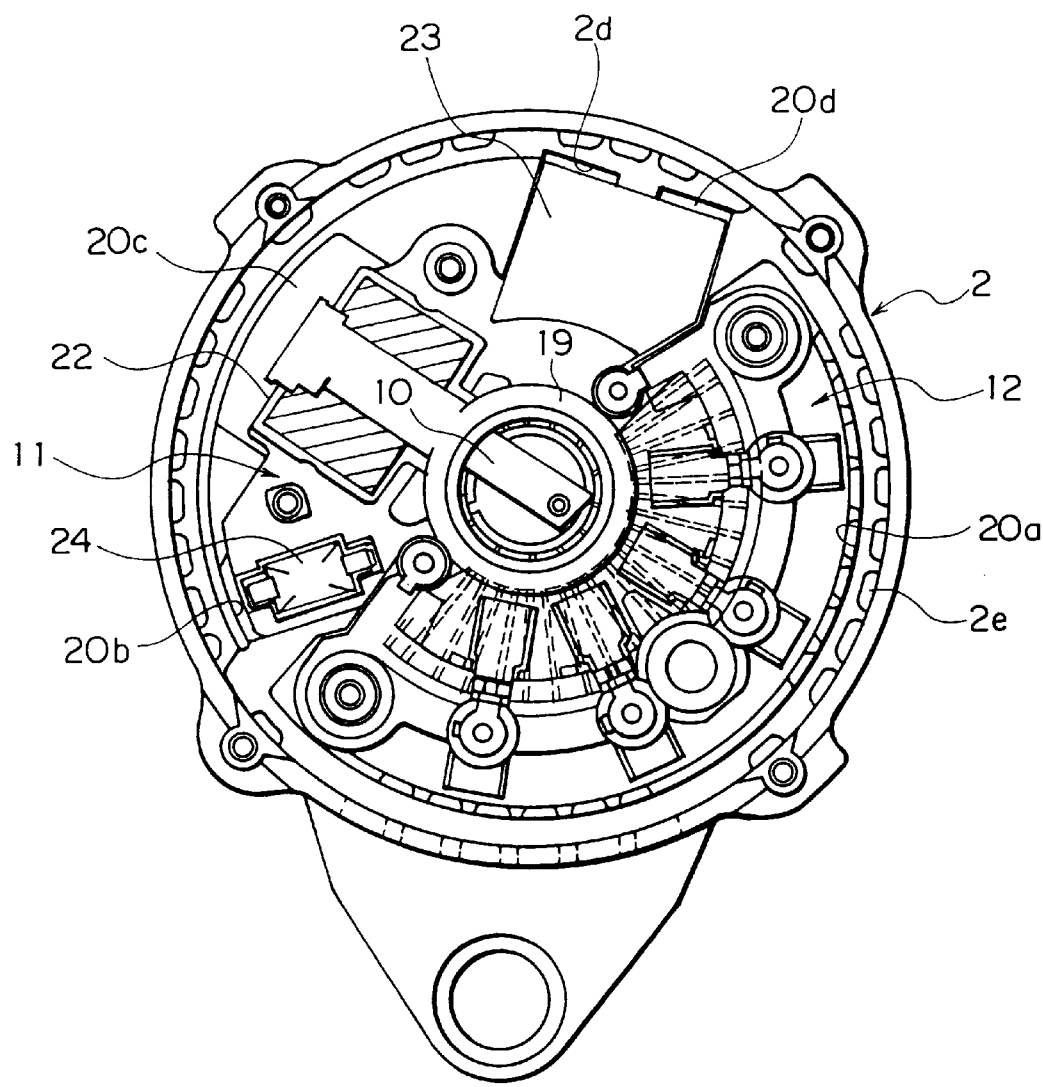
FIG. 17 is an internal view of the condition in which the rectifier and the brush holder in the conventional AC generator are fitted into the rear bracket.
Figure 18:
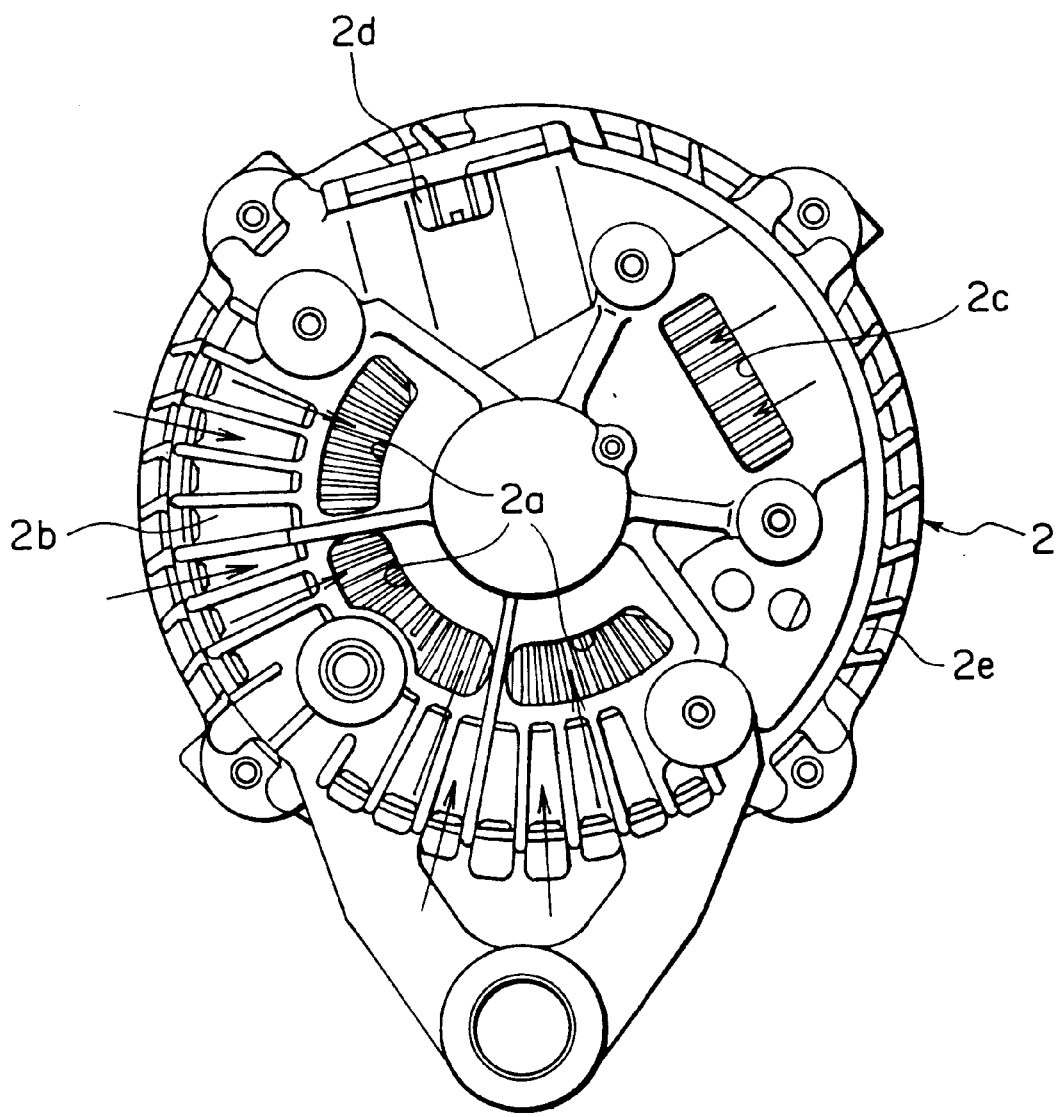
FIG. 18 is a rear view of the conventional AC generator.
Figure 19:
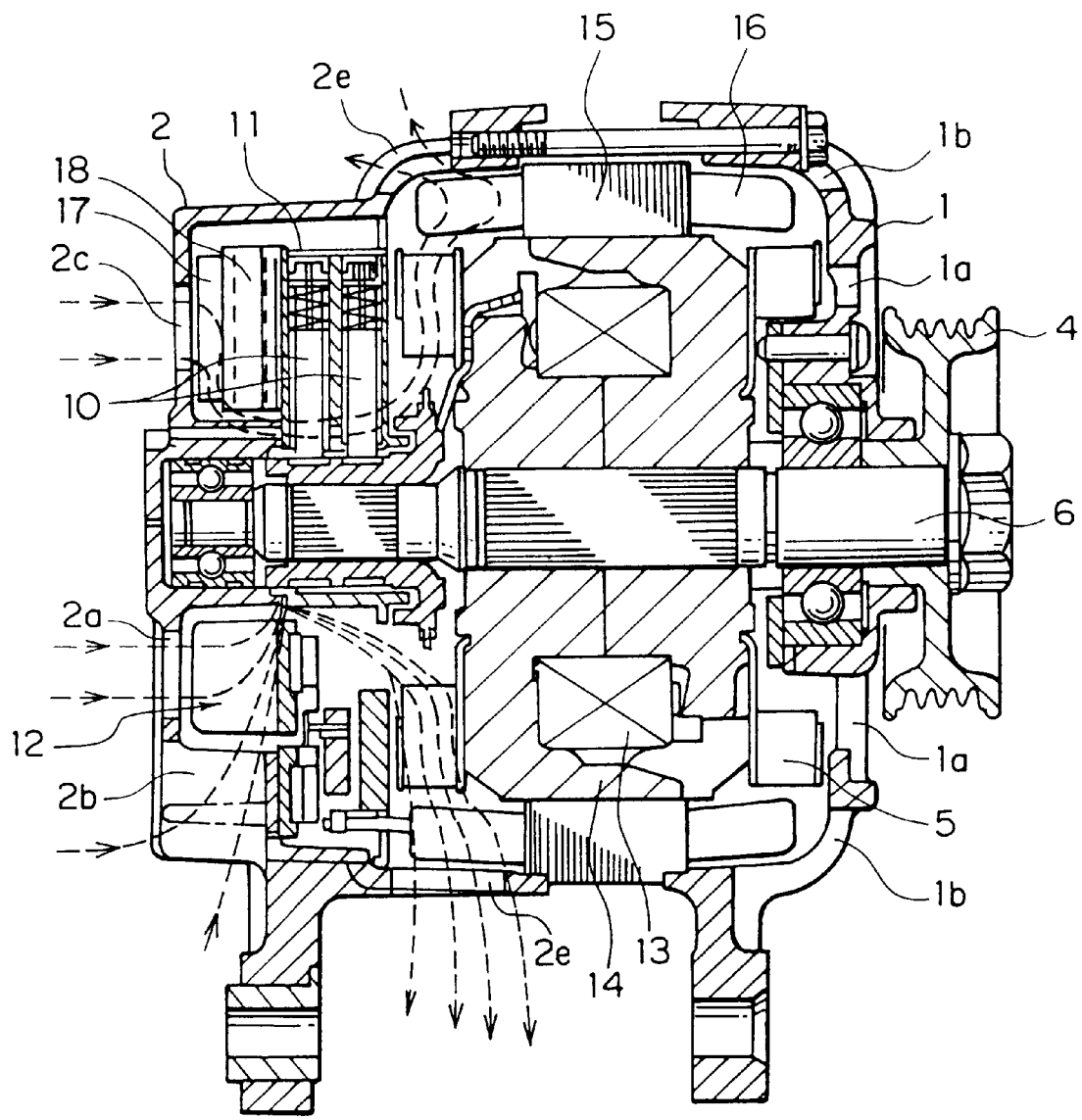
FIG. 19 is a cross-sectional view for explaining the flow of the cooling air in the conventional AC generator.
Figure 20:
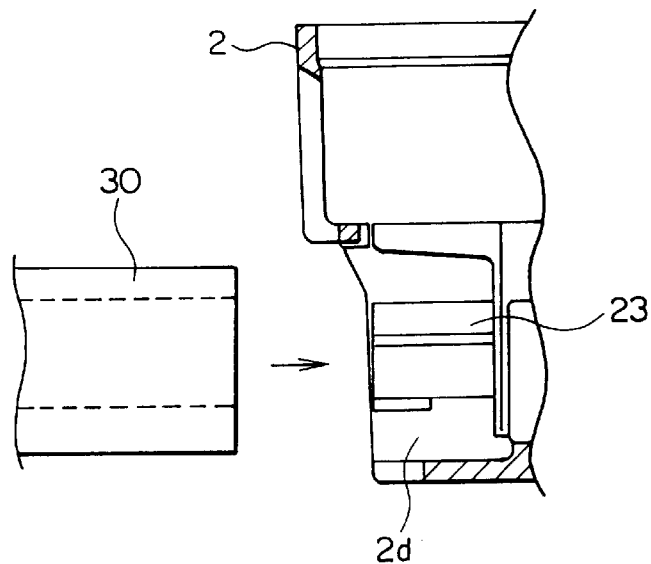
FIG. 20 is a cross-sectional view of the essential portion for explaining the relationship between the connector portion and the rear bracket in the conventional AC generator.
Figure 21:
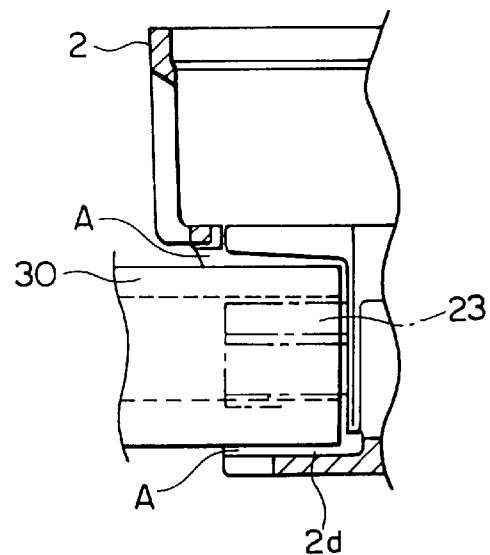
FIG. 21 is a cross-sectional view of the essential portion illustrating the condition in which an external connector is fitted in the conventional AC generator.

Incidentally, the arrangements other than that is similar to the of the conventional AC generator of FIG. 11.

At the rear side of the AC generator arranged as above, the external air is sucked from the intake openings 51a, 51b, 51c into the rear bracket 50 by the action of the centrifugal fan 5. The external air sucked from the intake openings 51a, 51b, 51c flows inwardly in the radial direction along the fins of the heat sinks 17, 31a, and then flows from the ends of the inner circumference of the heat sinks 17, 31a toward the front bracket 1 along the axis. After that, it is bent in the centrifugal direction by means of the centrifugal fan 5 to be discharged out of the exhaust openings 51e of the rear bracket 50 to the exterior. At this time, the air streams which has flown along the fin of the heat sinks 17, 31a are blocked from flowing in the circumferential direction by the axial height of the barriers 50e through 50h, flow in the radial direction up to the ends of the inner circumference of the heat sinks 17, 31a without interfering with each other and subsequently flow therefrom toward the front bracket 1 along the axis. The heat exchange between the air streams flowing along the fins of the heat sinks 17, 31a and the heat sinks 17, 31a suppresses elevation of the temperature of the diodes of the rectifier 12 and the power transistors of the regulator 18, which are the heat generating source. Further, the air streams are bent in the centrifugal direction by means of the centrifugal fan 5 and subsequently cool the rear end of the stator coil 16 to suppress elevation of the temperature of the stator coil 16.

On the other hand, the air sucked from the intake openings la of the front bracket 1 is also bent in the centrifugal direction by the centrifugal fan 5 to cool the front end of the stator coil 16 to be discharged from the exhaust openings 1b of the front bracket 1 to the exterior.

Next, when the AC generator incorporated with this rear bracket 50 is made and a test for elevation of temperature was carried out, the use of the saturation temperature at the rate of 3000 r/min proved to be 7° C. lower for the diode of the rectifier 12 and 5° C. lower for the regulator as compared with the AC generator incorporated with the rear bracket 2.

Further, as an incidental effect, it proved to be 13° C. lower for the stator 8 and 7° C. lower also for the bearing lying at the axis. This is perhaps due to the fact that since the cooling air streams flowing about the rear part stop mutual interference and are rectified the pressure loss at this site is decreased and the overall amount of cooling air is increased until even the temperature of the stator 8 and bearing is decreased.

As described above, according to the first embodiment, the barriers 50e through 50h having the axial height are integrally formed on the surface of the inner wall of the rear bracket 50 to separate the rectifier accommodating portion 50a, the condenser accommodating portion 50b, the regulator accommodating portion 50c and the connector accommodating portion 50d from one another in the circumferential direction. Therefore, the air streams that are sucked from the intake openings 51a, 51b, 51c by the action of the centrifugal fan 5 and that subsequently cool the rectifier 12 and the regulator 18 are blocked from flowing in the circumferential direction by the barriers 50e through 50h, are separated from each other, flow toward the inner circumference in the radial direction, and then are rectified into axial streams. As a result, the air stream which has cooled the regulator 18 is blocked from counterflowing toward the rectifier 12, and the rectifier 12 can be effectively cooled down. The air streams which have cooled the rectifier 12 and the regulator 18 do not interfere with each other, and the pressure loss is decreased so that the overall amount of the cooling air can increased to obtain an excellent cooling performance.

In addition, the air streams which have cooled the rectifier 12 and the regulator 18 are blocked from flowing in the circumferential direction by means of the barriers 50e to 50h, are separated from each other, flows radially in the direction of inner circumference, and after are rectified into axial steams. As a result, the unevenness of the cooling air stream which is caused by miniaturization of the AC generator becomes difficult to occur, so that it becomes possible to suppress degradation of the cooling performance due to the unevenness of the cooling air.

Further, since the connector portion 23 is separated from the rectifier accommodating portion 50a and the regulator accommodating portion 50c by the barriers 50e, 50h having an axial height, the air which has cooled the rectifier 12 and the regulator 18 is prevented from flowing backward and out of the gaps between the connector receiving hole 51d and the connector portion 23 and between the connector receiving hole 51d and the external connector 30 respectively. As a result, the decrease of the overall amount of cooling air is suppressed to allow the heat generating portion to be cooled effectively. Further, since the pressure loss at the barriers 50e, 50h becomes great, the external air becomes difficult to flow in from the connector receiving hole 51d and, the amount of air which is sucked from the in take openings 51a, 51b, 51c is increased correspondingly, enabling the beat generating portion to be cooled effectively.

Further, since the condenser accommodating portion 50b is separated from the rectifier accommodating portion 50a and the regulator accommodating portion 50c by the barriers 50f, 50g having an axial height, the air streams which have cooled the rectifier 12 and the regulator 18 do not counterflow toward the condenser accommodating portion 50b, but the condenser 22 is thermally blocked from the rectifier 12 and the regulator 18 to allow the working reliability of the condenser 29 about the contact to be improved.

Further, since the barriers 50e through 50h constituting the cooling air passage are integrally provided on the rear bracket 50, there is no need to constitute the cooling air passageway with some independent part allowing improvement of assembly performance and workability.

Incidentally, although, in the foregoing first embodiment, the rectifier 12, the condenser 29, the regulator 18 and the connector portion 23 are to be arranged circumferentially in a scattered manner on the plane intersecting at a right angle with the axis, their disposition order is not restricted to this, but, it may be disposed in the order of, for example, the rectifier 12, the connector portion 23, the regulator 18 and the condenser 29.

Further, although, in the foregoing first embodiment, description is made as to the AC generator comprising the condenser 29, this invention may also be applied to the AC generator without it to achieve a similar effect.

Further, although, in the foregoing first embodiment, the barriers 50e, 50h separating the connector accommodating portion 50d are shared in common with the barrier separating the rectifier accommodating portion 50a or the regulator accommodating portion 50b, the connector accommodating portion 50d may be separated by means of barriers different from the latter. In this case, the connector accommodating portion 50d is more distinctly separated from the rectifier accommodating portion 50a and the regulator accommodating portion 50c, so the air streams which have cooled the rectifier 12 and the regulator 18 are certainly blocked from flowing backward and out of the gaps between the connector insertion hole 51d and the connector portion 23 and between the connector insertion hole 51d and the external connector 30.

Still further, although, in the foregoing first embodiment, the barriers 50e through 50h are to be integrally formed with the rear bracket 50, these barriers may be formed with another member distinct from the rear bracket 50. In this case, the rectifier accommodating portion 50a, the condenser accommodating portion 50b, the regulator accommodating portion 50c and the connector accommodating portion 50d can be securely separated. Second Embodiment FIG. 7 is a rear view of a brush holder which is applied to the AC generator according to a second embodiment of the present invention, and FIG. 8 is a front view of a rectifier which is applied to the AC generator according to a second embodiment of the present invention.

Figure 7:
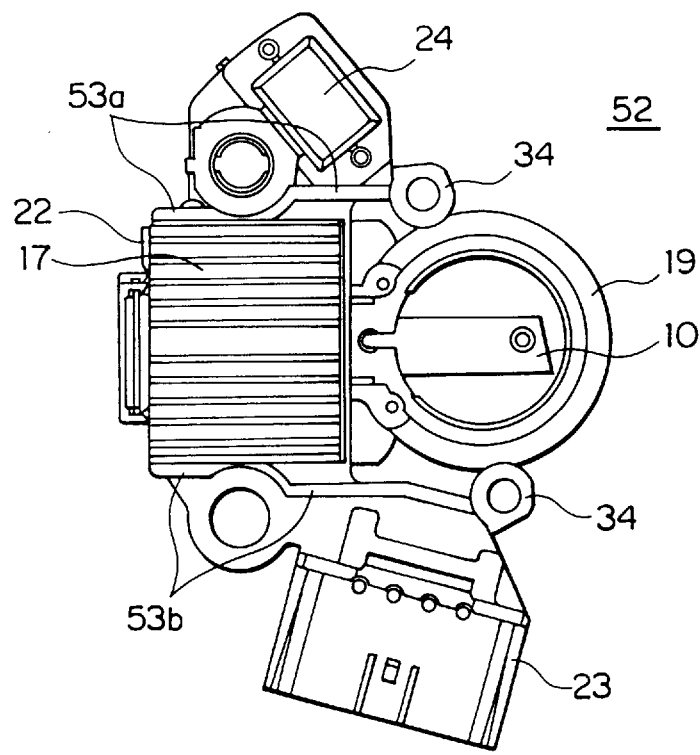
FIG. 7 is a rear view of a brush holder applied to the AC generator according to a second embodiment of the present invention.

In FIG. 7, a brush holder 52 as the mold member is molded from insulating resin, and is integrally molded with an annular shaft receiving portion 19, a circuit accommodating portion 22, a connector potion 23, a condenser accommodating portion 24 and barriers 53a, 53b as the cooling air passageway. The barriers 53a,53b are integrally formed during molding of the brush holder 52, and are provided to extend with an axial height similar to that of the fin of the heat sink 17, which is fitted to the circuit accommodating portion 22, along both sidewall of the circuit accommodating portion 22. This brush holder 52 has an arrangement similar to that of the above-described brush holder 11 except that the barriers 53a, 53b are provided.

Figure 8:
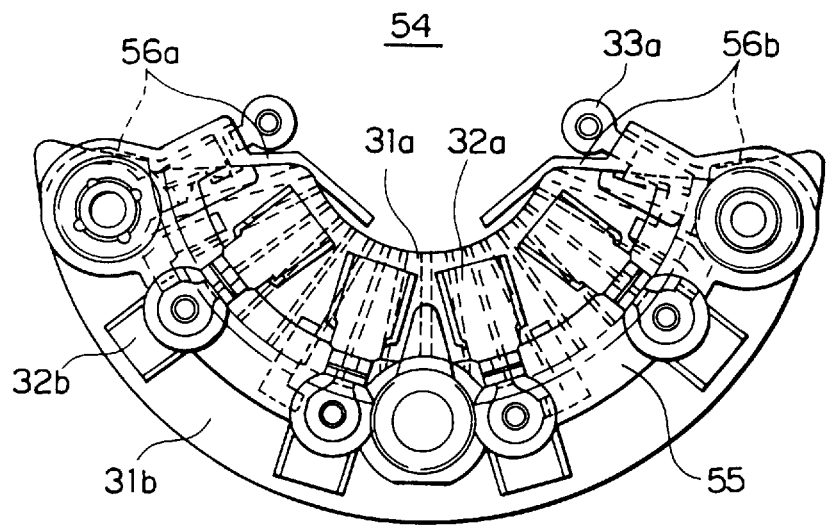
FIG. 8 is a front view of a rectifier applied to the AC generator according to a second embodiment of the present invention.

In FIG. 8, the rectifier 54 is arranged with a pair of arc-shaped heat sinks 31a, 31b on whose main surface the positive diode 32a and the negative diode 32b are each mounted in plurality, and an arc-shaped circuit board 55 in which a number of conductors are insert-molded into insulating resin. When the circuit board 55 is insert-molded, barriers 56a, 56b are provided to extend with an axial height similar to that of the fin of the heat sink 31a at both circumferential ends of the circuit board 55 along both circumferential ends and inner circumferential ends of the heat sink 31a. This circuit board 55 has an arrangement similar to that of the above-described circuit board 33 except that the barriers 56a, 56b are provided thereon.

Incidentally, this second embodiment has an arrangement similar to that of the conventional AC generator of FIG. 11 except that the brush holder 52 and the rectifier 54 are used in place of the brush holder 11 and the rectifier 12.

As described above, in this second embodiment, since the barriers 53a, 53b having an axial height are provided integrally with the brush holder 52 to extend along both sidewall of the regulator accommodating portion 50c and the barriers 56a, 56b having an axial height are provided integrally with the circuit board 55 to extend along both circumferential ends and circumferential end side of the inner circumferential end of the heat sink 31a, the rectifier accommodating portion 50a, the condenser accommodating portion 50b, the regulator accommodating portion 50c and the connector accommodating portion 50d are each separated in the circumferential direction. Therefore, the air streams which are sucked from the intake openings 2a, 2b, 2c by the action of the centrifugal fan 5 and which subsequently cool the rectifier 54 and the regulator 18 are blocked from flowing in the circumferential direction by the barriers 53a, 53b, 56a, 56b, are separated from each other, and flow toward the radial inner circumferential side to be rectified into the axial stream.

Therefore, also in this second embodiment, an effect similar to that of the foregoing first embodiment can be achieved.

Further, in this second embodiment, since the barriers 53a, 53b, 56a, 56b constituting the cooling air passageway are integrally formed when the brush holder 52 and the circuit board 55 are molded, it is excellent in configurational degree of freedom as compared with the foregoing first embodiment in which the barriers are integrally formed with the rear bracket 50 by casting or aluminum die casting to ease formation of the complicated configurations such as at the flexible portions.

Further, since the barriers 53a, 53b, 56a, 56b are formed with the mold resin member, there is no need to increase any exposed metal portions as in the first embodiment, so that any galvanic corrosion between the bracket, which is the negative pole, and the positive pole can be suppressed. Third Embodiment FIG. 9 is an internal view of the rear cover which is applied to the AC generator according to a third embodiment of the present invention., and FIG. 9 is a cross-sectional view of FIG. 10 taken along line X—X.

Figure 9:
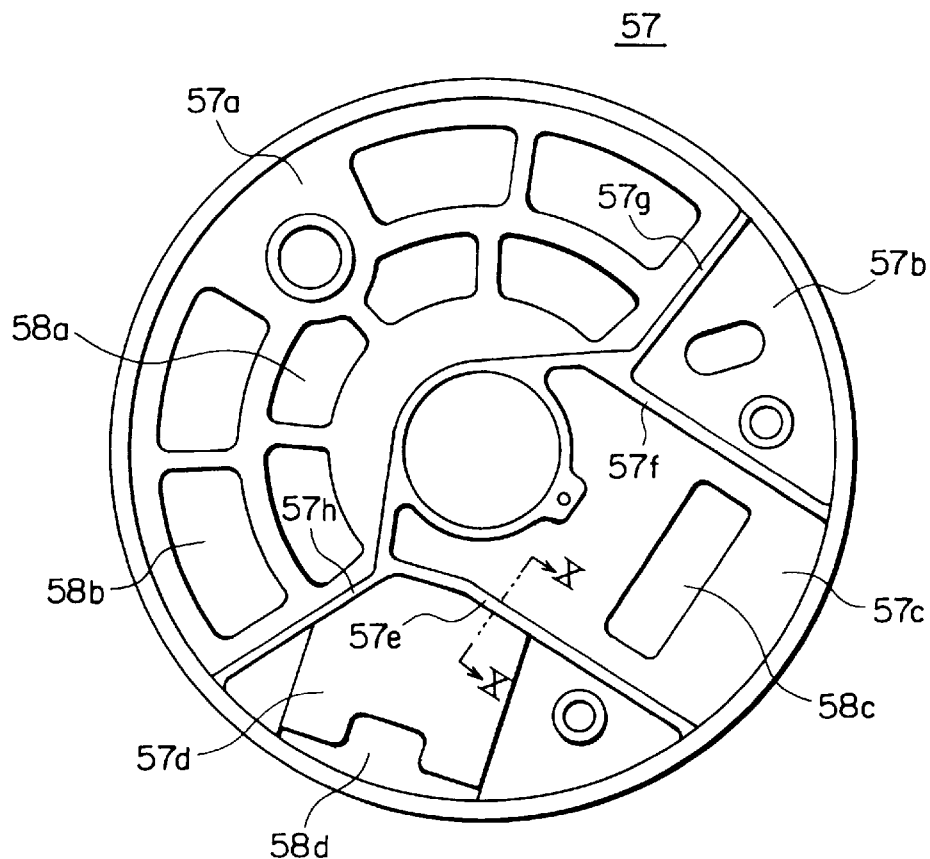
FIG. 9 is an internal view of a rear cover applied to the AC generator according to a third embodiment of the present invention.
Figure 10:
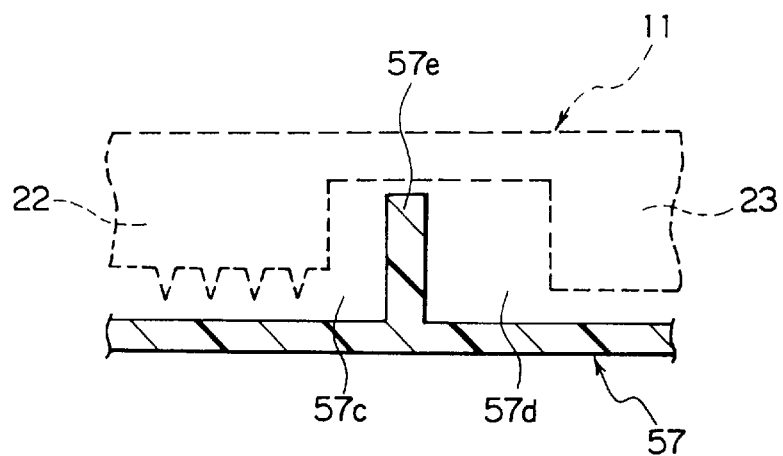
FIG. 10 is an internal view of FIG. 9 taken along line X—X thereof.

In FIGS. 9 and 10, a rear cover 57 as the case is made of resin taking the form of a bowl, and axially height barriers 57e through 57h constituting the cooling air passageway are integrally provided on the surface of the inner wall of the rear cover 57 so as to separate a rectifier accommodating portion 57a, a condenser accommodating portion 57b, a regulator accommodating portion 57c and a connector accommodating portion 57d from each other. Further, intake openings 58a, 58b, 58c for ventilation and a connector receiving hole 58d for receiving an external connector are provided through the rear cover 58 so as to communicate the rectifier accommodating portion 57a, the regulator accommodating portion 57c and the connector accommodating portion 57d with the exterior.

Further, although not shown, a rectifier 12 and a brush holder 11 are attached to the outer circumferential surface of the rear bracket 2A. The rectifier 12, the regulator 18 (the ceramic substrate 21), the connector portion 23 and the condenser 29 are arranged circumferentially in a scattered manner on the substantially identical plane so as to surround the shaft 6 and so as not to overlap each other in the axial direction. The rear cover 57 is attached to the rear bracket 2A from the outer circumferential side, the rectifier 12 is accommodated within the rectifier accommodating portion 57a, and a circuit accommodating portion 22, the connector portion 23 and the condenser accommodating portion 24 of the brush holder 11 are each accommodated within the regulator accommodating portion 57c, the connector accommodating portion 57d and the condenser accommodating portion 57b. Thus the rectifier accommodating portion 57a, the condenser accommodating portion 57b, the regulator accommodating portion 57c and the connector accommodating portion 57d are separated form each other in the circumferential direction by the barriers 57e through 57h.

Figure 22:
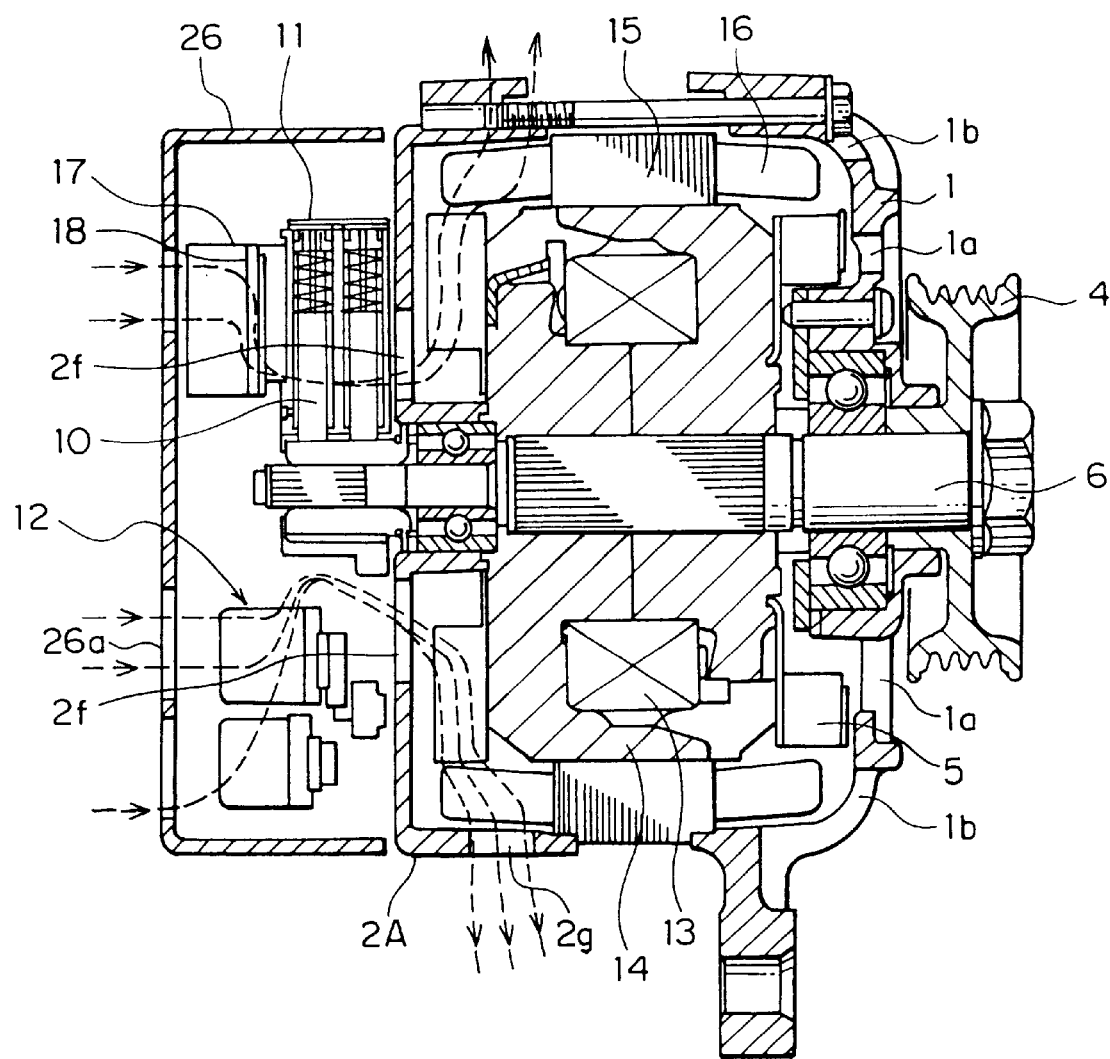
FIG. 22 is a cross-sectional view of the arrangement of another conventional AC generator.

Incidentally, the arrangement other than those are substantially the same as in the conventional AC generator of FIG. 22.

In this third Embodiment, the rectifier accommodating potion 57a, the condenser accommodating portion 57b, the regulator accommodating portion 57c and the connector accommodating portion 57d are separated from each other in the circumferential direction by the axially high barriers 57e through 57h. The air streams which were sucked from the intake openings 58a, 58b, 58c by the action of the centrifugal fan 5 and which subsequently cool the rectifier 12 and the regulator 18 are blocked from flowing in the circumferential direction, are separated from each other, flow radially toward the inner circumference and then flow from the inner circumferential end of the heat sink 17, 31a through the intake opening 2f of the rear bracket 2A along the axis toward the front bracket 1. The air sucked into the rear bracket 2A is bent in the centrifugal direction by the centrifugal fan 5 to cool the end of the stator coil 16 to be exhausted from the exhaust openings 2g to the exterior.

Therefore, also in this third Embodiment, an effect similar to that of the foregoing first embodiment can be obtained.

Although, in the foregoing third Embodiment, the barriers 57e through 57h constituting the cooing air passageway are integrally provided with the rear cover 57, they may be integrally provided with the mold resin members of the brush holder and the circuit board of the rectifier, or maybe integrally provided with the rear bracket 2A.

Further, although, in the third Embodiment, the brush holder 11 and the rectifier 12 are to be attached to the rear bracket 2A, they may be attached to the rear cover 57. In this case, the barriers constituting the cooling air passageway maybe provided integrally with the rear cover 57, or maybe provided integrally with the mold resin members of the bracket holder and the circuit board of the rectifier, or may be provided integrally with the rear bracket 2A.

Incidentally, although, in the foregoing embodiments, the circuit accommodating portion, the connector potion and the condenser accommodating portion are to be formed integrally with the brush holder only the circuit accommodating portion, the connector member and the condenser accommodating portion may be integrally molded, and may be formed with another member distinct from the brush holder. Or the circuit accommodating portion, the connector portion and the condenser accommodating portion may each be formed with a different member.

Since the present invention is arranged as above, the following effects can be achieved.

According to the present invention, there is provided an AC generator comprising: a shaft supported in a case so as to be able to rotate freely; a rotor disposed in the case and composed of a pair of pole cores each having a plurality of claw portions protruding from the outer circumferential edge portion thereof, the pole cores being fixedly fitted over the shaft in an opposed relation each other so that the claw portions are able to engage with each other; a stator disposed within the case so as to be positioned around the periphery of the rotor; centrifugal fans secured to both axial ends of the rotor; a rectifier for rectifying an alternating current generated in the stator to a direct current; a regulator for regulating an output voltage of the stator; and a connector portion to which an external connector is fitted; wherein the rectifier, the regulator and the connector portion arranged circumferentially in a scattered manner on a plane intersecting at a right angle with the axis of the shaft at one end of the shaft so as not to overlap each other in the axial direction; wherein intake openings are provided at one end surface of the case so as to face the rectifier and the regulator, and wherein a plurality of exhaust openings are provided at the outer circumference of the case in the circumferential direction; the AC generator further comprising a cooling air passageway in which the air streams that are sucked from the intake openings by the action of the centrifugal fan and that subsequently cool the rectifier and the regulator are blocked from flowing in the circumferential direction, are separated from each other and flow radially inward. As a result, the air streams which has cooled the rectifier and the regulator are rectified in the axial direction without interfering with each other, thereby the counterflow of the cooled air is eliminated while the pressure loss becomes small to realize an Ac generator having an improved cooling performance.

Further, since the foregoing cooling air passageway is formed with the barriers having an axial height which is integrally formed with the case, it can be formed without increasing the number of parts and the assembly performance and the workability can be improved.

Further, since the foregoing regulator and connector portion are integrally formed with the mold member, the foregoing rectifier is comprised of the pair of heat sinks for supporting the plurality of diodes and the circuit board molded with the connection terminal, and the cooling air passageway is formed by the barriers having the axial height which are integrally formed with the mold member and the circuit board, their configurational degree of freedom becomes high while the passageway can be formed without increasing the metallic points to suppress the galvanic corrosion.

Still further, since the barriers having the axial height are disposed along the outer circumference of the connector portion so as to separate the connector portion from the air stream which has cooled the rectifier and the regulator, it cannot counterflow to leak from the connector receiving hole while the amount of air which is sucked from the connector receiving hole becomes smaller and the amount of cooling air is increased correspondingly to improve the cooling performance.

What is claimed is:

1. An AC generator for use in a vehicle, comprising:

a shaft supported in a case so as to be able to rotate freely;

a rotor disposed in said case and composed of a pair of pole cores each having a plurality of claw portions protruding from the outer circumferential edge portion thereof, said pole cores being fixedly fitted over said shaft in an opposed relation to each other so that said claw portions are able to engage with each other;

a stator disposed within said case so as to be positioned around the periphery of said rotor;

centrifugal fans secured to both axial ends of said rotor;

a rectifier for rectifying an alternating current generated in said stator to a direct current;

a regulator for regulating an output voltage of said stator; and a connector portion to which an external connector is fitted;

wherein said rectifier, said regulator and said connector portion are arranged circumferentially in a scattered manner on a plane intersecting at a right angle with the axis of the shaft at one end of said shaft so as not to overlap each other in the axial direction, wherein intake openings are provided at one end surface of said case so as to face said rectifier and said regulator, and wherein a plurality of exhaust openings arc provided at the outer circumference of said case in the circumferential direction;

said AC generator further comprising a cooling air passageway in which the air streams arc sucked from said intake openings by the action of said centrifugal fans, and subsequently cool said rectifier and said regulator wherein said air streams are blocked from flowing in the circumferential direction by a barrier configuration that separates a rectifier accommodation portion (50a), a condenser accommodation portion (50b), a regulator accommodation portion (50c), and a connector accommodation portion (50d), and are axially separated from each other and flow radially inward.

2. An AC generator for use in a vehicle as set forth in claim 1, wherein said cooling air passageway is defined by said barriers having an axial height and integrally formed with said case.

3. An AC generator for use in a vehicle as set forth in claim 1, wherein said regulator and said connector potion are integrally formed with a mold member, said rectifier is composed of a pair of heat sinks for supporting a plurality of diodes and a circuit board molded with a connection terminal, and said cooling air passageway is constituted by barriers having an axial height and integrally formed with said mold member and said circuit board.

4. An AC generator for use in a vehicle as set forth in claim 1, further comprising barriers having an axial height and disposed at the outer circumference of said connector portion so as to separate said connector portion from the air stream which has cooled said rectifier and said regulator.

* * * * *